June 29, 1971 R. F. SCHAUB Re. 27,148
WATER PRESSURE BOOSTER SYSTEM
Original Filed Aug. 30, 1965
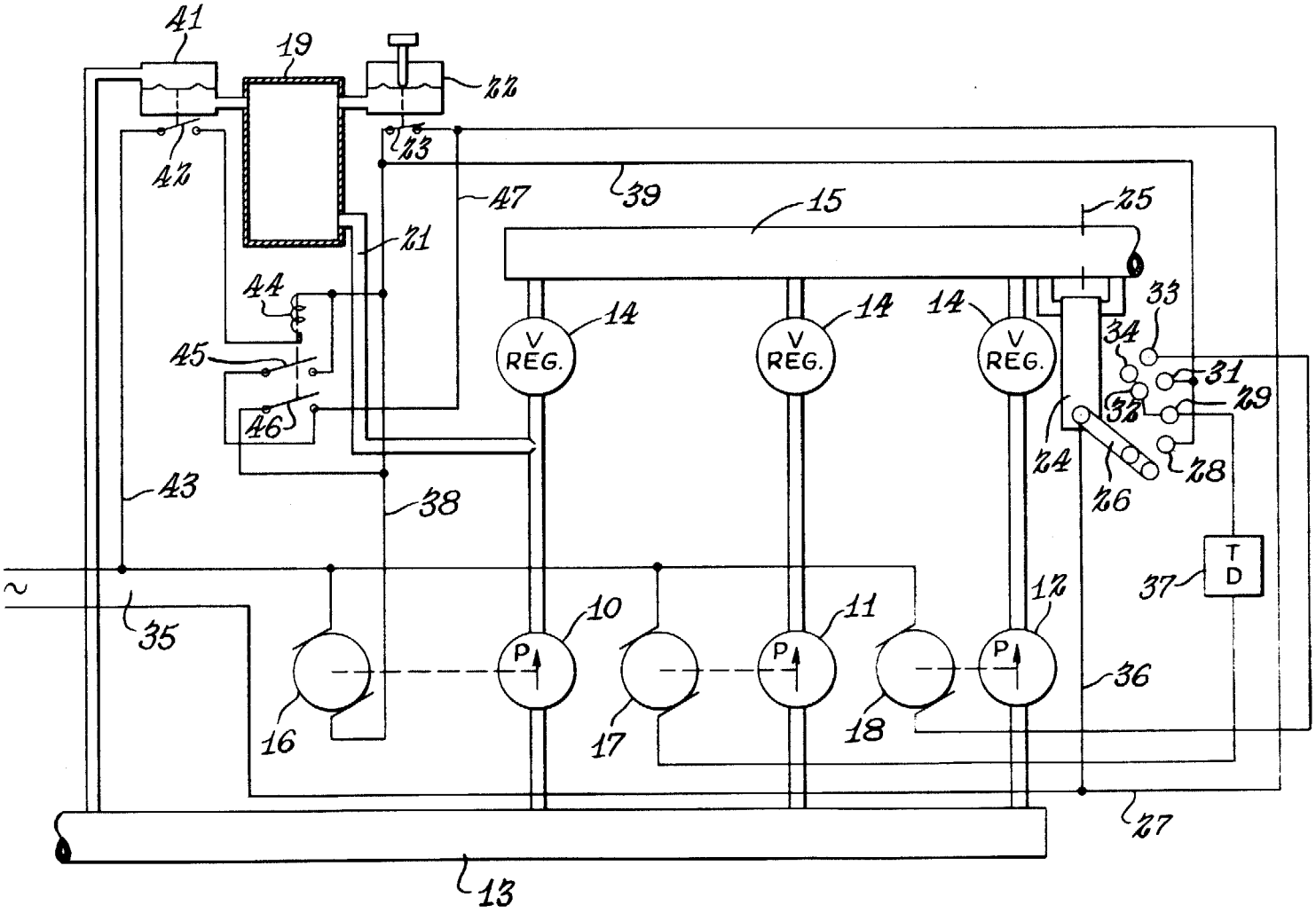
INVENTOR
ROBERT F. SCHAUB
BY
Fair, Freeman & Molinare
Attys.

United States Patent Office

Re. 27,148
Reissued June 29, 1971

27,148
WATER PRESSURE BOOSTER SYSTEM

Robert F. Schaub, La Grange, Ill., assignor to Schaub Engineering Company, Downers Grove, Ill.

Original No. 3,369,489, dated Feb. 20, 1968, Ser. No. 483,646, Aug. 30, 1965. Application for reissue Feb. 19, 1970, Ser. No. 12,683
Int. Cl. F04b *41/06, 49/00*
U.S. Cl. 417—6 8 Claims

Matter enclosed in heavy brackets [ ] appears in the original patent but forms no part of this reissue specification; matter printed in italics indicates the additions made by reissue.

ABSTRACT OF THE DISCLOSURE

A water pressure system combining a hydro-pneumatic tank and a plurality of mechanical pumps to provide continuous constant water pressure at all taps throughout the system regardless of tap size or elevation. The pumps are in a parallel arrangement between the water source and a pressure regulated discharge conduit. One of the pumps provides water to the hydro-pneumatic tank for low demand situations. The others pumps are activated as the demand rises. Low demands are satisfied by the hydro-pneumatic tank without activating the mechanical pumps. The system substantially eliminates unwanted pressure fluctuations.

This invention relates to a water pressure booster system and more particularly to a combined hydro-pneumatic and a continuously running pump system.

Heretofore water pressure systems in common use have been tank type systems in which water is pumped into a closed tank containing air and starting and stopping of the pump is controlled in response to the pressure in the tank. Such systems are subject to the following disadvantages, all of which are accentuated in larger systems for office and apartment buildings and the like: (1) they require a large tank which is expensive and which occupies a large amount of expensive space; (2) they are difficult and expensive to replace particularly in the case of large tanks which are placed in the building during original construction and which require assembling on the job in sections for replacement or tearing out part of the building structure to gain access; (3) the systems are subject to pressure fluctuations on the order of at least twenty to thirty pounds per square inch which represents the normal differential setting of the pressure switch controlling the pump; (4) the systems are subject to corrosion occasioned by absorption of air by the water held in the storage tank. While the air absorption problem may be answered to some extent by providing separate flexible enclosures similar to balloons in which the air is confined or by providing floats on the top of the water in the tank to minimize air absorption the other problem necessarily exist in a conventional hydro-pneumatic system.

Recently, continuously running pump systems have been developed which employ a plurality of pumps, commonly of different sizes, which are operated selectively and in predetermined combinations in response to variations in demand and at least one of which is running at all times. One such system is more particularly disclosed and claimed in my co-pending application Ser. No. 269,515 filed Apr. 1, 1963, now Patent No. 3,195,555. These systems overcome all of the disadvantages of the tank type systems but are subject to the disadvantages that one of the pumps must be running even during periods of zero or near-zero demand such as during the night hours or over week ends in the case of office buildings.

It is accordingly a principal object of the present invention to provide a water pressure system which combines the advantages of the hydro-pneumatic type tank systems and the continuously running pump systems while substantially eliminating the disadvantages of both.

Another object is to provide a water pressuse system which incorporates a small capacity hydro-pneumatic tank capable of handling only a small fraction of the maximum demand and connected to one pump only which is effective only during low demand periods with the system operating as a conventional continuously running pump system during periods of higher demand.

According to a feature of the invention the tank is connected to the pump at a point between the pump and the pressure regulator therefor so that fluctuations in tank pressure are not reflected in the building lines and so that wider pressue swings can be tolerated in the tank than with conventional hydro-pnuematic tank type systems.

According to another feature of the invention the cut-off of the supply of water to the tank is controlled in response to the difference in pressure between the supply source and the tank to take advantage of supply pressures higher than design minimum.

The above and other objects and features of the invention will be more readily apparent from the following description when read in connection with the accompanying drawing in which the single figure is a diagrammatic view of a water pressure system embodying the invention.

The invention may be applied to substantially any desired type of water pressure booster system including a single pump or two or more pumps. For purposes of illustration there is shown in the drawing a system similar to that disclosed in my co-pending application Ser. No. 269,515 which includes three pumps 10, 11 and 12 which may be of different sizes and capacities. For example the pump 10 may be of a size to supply approximately twenty-five (25) percent of the maximum anticipated demand while each of the pumps 11 and 12 is of a capacity to supply approximately fifty-five (55) percent of the anticipated maximum demand. Each of the pumps has its inlet connected to a water supply conduit 13 which may receive water under a pressure from a conventional city water supply main either directly or through an open storage tank. The outlet of each of the pumps is connected through a pressure regulating valve 14 to a main supply line 15 which leads to headers extending through the building and supplying water to the usual outlets therein as well as in the some cases supplying water to fire fighting systems. The pump 10 is driven by an electric motor 16 and the pumps 11 and 12 are driven by similar electric motors 17 and 18 which are of appropriate size to drive the respective pumps.

According to the present invention, the pump 10 is adapted to supply water to a hydro-pneumatic tank 19 which may be of conventional tank construction but which is of a size to supply a maximum of approximately fifteen (15) to twenty (20) percent of the anticipated maximum demand for water. In this way the tank may be made relatively small and it is preferably provided either with a flexible bag or similar closure to contain the air to minimize absorption of air in the water and to eliminate the necessity for a compressor or similar system to maintain air in the tank. As shown, the water-holding portion of the tank is connected through a conduit 21 to a point between the discharge side of the pump 10 and the regulator 14 therefor. The tank may be provided with a control device responsive to the quantity of water in the tank such as the usual pressure responsive mechanism 22 responsive to the pressure in the tank to close a switch 23 when the pressure is below a predetermined value and to open the switch when the pressure rises above a higher predetermined value. Assuming for example that a pressure of 100 pounds per square inch is desired in the line 15 the pressure switch may be adjusted to close when the pressure in the tank falls to approximately 105 pounds per square inch and to open when the pressure approaches the maximum head pressure of the pump employed (which would be 135 to 145 pounds per square inch for a steep-head-curve pump normally employed).

Control of the several pump motors is jointly effected by the switch 23 and by a flow meter 24 which is connected across an orifice 25 in a line 15. As diagrammatically illustrated, the flow meter moves a contact arm 26 into engagement with four different sets of contacts at different positions to effect the desired control of the pump motors. In the minimum or zero flow position illustrated, the contact arm disengages all of the contacts. When the flow exceeds approximately fifteen (15) or twenty (20) percent of the maximum anticipated demand, the contact arm will engage a contact 28. When the flow exceeds approximately twenty-five (25) percent of the maximum anticipated demand, the contact arm will engage a contact 29. When the flow is above approximately fifty-five (55) percent of the anticipated demand, the contact arm will engage a pair of contacts 31 and 32. When the flow exceeds approximately eighty (80) percent of the maximum anticipated demand, the contact arm will engage a pair of contacts 33 and 34. As shown, the contacts 29, 32 and 34 are interconnected and the contact 31 is interconnected with the contact 28. It will be understood that these values are by way of example only and could vary widely depending upon the number of pumps and the desired division of the load.

One side of a source of power indicated at 35 is connected directly to each of the motors 16, 17 and 18. The other side of the power source is connected through a wire 36 to the contact arm 26 and through a wire 27 to the switch 23. The contacts 29, 32 and 34 are connected through a time delay device 37 to the other side of the motor 17 and the contact 33 is connected to the other side of the motor 18. The other side of the motor 16 is connected through a wire 38 with the switch 23 and also with a wire 39 leading to the contact 28 and 31.

When the supply line 13 is connected to a variable pressure source such as a source of city water pressure that may be desirable to permit the pressure in the tank 19 to build up to a higher value to take advantage of higher pressure at the source. For this purpose, as shown a differential pressure responsive device 41 is connected at one side to the upper part of the tank 19 and at its other side to the supply conduit 13. The differential pressure device 41 closes a switch 42 when the differential pressure is below a predetermined value and opens the switch 42 when the differential pressure rises above the value or a slightly higher predetermined value. One side of the switch 42 is connected directly to one side of the source of power through a wire 43 and the other side is connected to one end of a relay coil 44 which when energized closes two normally open switches 45 and 46. The switch 45 is a holding switch which when closed completes a circuit through a wire 47 from the contact 27 through the coil 44 and switch 42 to one side of the power source. The switch 46 when closed completes a circuit from the contact 27 through the wire 47 to the other side of the motor 16 to maintain the motor energized as long as the switch 46 is closed and the contact 26 is in engagement with the contact 27.

In operation, when the demand is below approximately fifteen (15) or twenty (20) percent of the anticipated maximum demand, and if the pressure in the tank 19 is below the set cutoff pressure, the switch 23 will be closed and the motor 16 will be energized to drive the pump 10. The pump 10 will supply whatever small demand may exist with its excess capacity being pumped into the tank 19 to build up the pressure therein. As soon as the pressure in the tank reaches the cutoff point for which the pressure device 22 is set, the switch 23 will be opened and normally the motor 16 will be stopped.

However, in cases where the pressure differential device 31 is employed, the motor may continue to operate if the inlet pressure is above normal until the tank reaches a pressure sufficiently high so that the differential between the tank pressure and supply pressure will cause the switch 42 to open. As water is withdrawn through the system with the demand remaining below the approximately fifteen (15) or twenty (20) percent level, water will be taken from the tank until the pressure therein drops to the point where the pressure responsive device 22 again closes the switch 23. At this time the motor 16 will again be energized to drive the pump 10 and the cycle will repeat in the same manner as the cycling of a conventional hydro-pneumatic tank system.

At any time the demand exceeds the approximately fifteen (15) or twenty (20) percent level mentioned above, the contact 26 will close a circuit to the contact 28. At this time the motor 16 will be continuously energized through the contact 28 and wires 39 and 38 so that the pump 10 will operate continuously. At this time the hydro-pneumatic tank 19 will be filled with water but the switches 23 and 42 will be wholly ineffective to control operation of the motor 16.

Should the demand increase to a point above the capacity of the pump 10, about twenty-five (25) percent of the expected maximum demand, the contact 26 will disengage the contact 28 and will close a circuit to the contact 29. At this time the motor 16 will be de-energized and the motor 17 will be energized through the time delay device 37 to drive the larger pump 11. The time delay device 37 is preferably provided so that the pump 11 will not be started in the event there is a momentary short demand for water in excess of the twenty-five (25) percent demand rate which can be satisfied by the pump 10. After the time delay device 37 has run through its time cycle, preferably on the order of a very few seconds, the motor 17 will be energized to drive the pump 11 which is of a size to satisfy the existing demand.

Upon a further increase in demand to above approximately fifty-five (55) percent of the anticipated maximum demand the contact 26 will move up further to engage contacts 31 and 32. The circuit through contact 32 will maintain the motor 17 in operation while the circuit completed through contact 31 will again energize the motor 16 through the wires 39 and 38. Thus both pumps 10 and 11 will be driven simultaneously and have a maximum capacity equal to approximately eighty (80) percent of the maximum anticipated demand. Should the demand exceed approximately eighty (80) percent or perhaps somewhat less than that the contact 26 will further be moved to engage contacts 33 and 34. The circuit through contact 34 will maintain the motor 17 and pump 11 in operation while the circuit through contact 33 will energize the motor 18 to drive the pump 12. Thus at this time both pumps 11 and 12 are simultaneously in operation and provide a maximum rated capacity equal to about 110 percent of the maximum anticipated demand.

It will be seen that the present system combines the advantageous features of both the hydro-pneumatic tank system and the continuously running pump systems. Since the tank need accommodate only about fifteen (15) or twenty (20) percent of the maximum anticipated demand it can be made of relatively small size so that it will be relatively inexpensive and will occupy a small amount of space. Furthermore it can easily be replaced should this become necessary without the necessity of constructing the new tank on the site or of tearing out any portion of the building structure to remove the old tank and bring in a new one. Also the objectionable pressure fluctuations of a conventional hydro-pneumatic tank system are eliminated by connecting the tank to the pump 10 at a point ahead of the pressure regulator valve 14 for that pump so that flow from the tank into the building supply line 15 must go through the pressure regulating valve. This arrangement also enables the tank to accommodate much wider pressure ffuctuations thereby again aiding in reducing the size of the tank without producing objectionable pressure fluctuations at the fittings.

While one embodiment of the invention has been shown and described in detail it will be understood that this is for the purpose of illustration only and is not to be taken as a definition of the scope of the invention, reference being had for this purpose to the appended claims.

What is claimed is:

[1. A water pressure system comprising a plurality of pumps connected in parallel between a water supply source and a discharge conduit, pressure regulating means for said discharge conduit, a closed hydro-pneumatic tank adapted to contain both water and air, a connection from one of the pumps to the tank to pump water into the tank, a control device responsive to pressure in the tank to start said one pump when the pressure is below a predetermined value and to stop it when the pressure is above a higher predetermined value, control means responsive to the demand on the system, means operated by the control means when the demand exceeds a predetermined low value to cause said one pump to operate continuously irrespective of the control device, and means operated by the control means when the demand exceeds a higher value to start a second pump.]

[2. The water pressure system of claim 1 wherein said pressure regulating means include pressure regulators between each of the pumps and the discharge conduit and in which the connection from the tank to said one of the pumps is to a point between the pump and the pressure regulator therefor.]

[3. The water pressure system of claim 1 including a second control device responsive to the difference in pressure between the supply source and the tank, and means operated by the second control device to maintain said one pump in operation until said difference in pressure reaches a predetermined value.]

[4. The water pressure system of claim 1 in which the means for starting the second pump includes a time delay device.]

5. A water pressure system comprising a plurality of pumps connected in parallel between a water supply source and a discharge conduit, pressure regulating means for said discharge conduit, a closed hydro-pneumatic tank adapted to contain both water and air, a connection from one of the pumps to the tank to pump water into the tank, a control device responsive to pressure in the tank to start said one pump when the pressure is below a predetermined value and to stop it when the pressure is above a higher predetermined value, control means to disable the control device under predetermined demand conditions, and control means responsive to demand on the system to control operation of all of the pump selectively and in predetermined combinations.

6. A water pressure system comprising a plurality of pumps connected in parallel between a water supply source and a discharge conduit, pressure regulating means for said discharge conduit, a closed hydro-pneumatic tank adapted to contain both water and air, a connection from one of the pumps to the tank to pump water into the tank, a control device responsive to pressure in the tank to start said one pump when the pressure is below a predetermined value and to stop it when the pressure is above a higher predetermined value, a flowmeter responsive to flow through the discharge conduit, a plurality of contacts selectively operated by the flowmeter at different predetermined flow rates, the contact for minmium flow being connected to the control device to make it [effective] *ineffective* and the contacts for higher flows being connected to operating means for the pumps to control operation of the pumps selectively and in predetermined combinations independently of the control device.

7. A water pressure system comprising a plurality of pumps connected in parallel between a water supply source and a discharge conduit, pressure regulating means for said discharge conduit, a pressure regulator between each of the pumps and the discharge conduit, a closed hydro-pneumatic tank, a connection from the tank to a point between a first of the pumps and the pressure regulator therefor, a control device responsive to the pressure in the tank to start the first pump when the pressure is below a predetermined value and to stop it when the pressure is above a higher predetermined value, a flowmeter responsive to flow through the discharge conduit, a plurality of switches selectively closed by the flowmeter at different flow rates, the switch closed at minimum flow being connected to the control device to make it [effective] *ineffective* and the switches closed at higher flows directly controlling operation of all of the pumps.

8. The water pressure system of claim 7 including a second control device responsive to the pressure differential and the water supply source, and means controlled by the second control device to maintain the first pump in operation until the pressure differential reaches a predetermined value.

*9. A water pressure system comprising a plurality of pumps connected in parallel between a water supply source and a discharge conduit, a plurality of motors associated one with each of said pumps, pressure regulating means for said discharge conduit, a closed hydro-pneumatic tank adapted to contain both water and air, a connection from one of the pumps to the tank to pump water into the tank, a control device responsive to pressure in the tank to start the motor of said one pump when the pressure is below a predetermined value and to stop it when the pressure is above a higher predetermined value, control means responsive to the demand on the system, means operated by the control means when the demand exceeds a predetermined low value to cause the motor of said one pump to operate continuously irrespective of the control device, means operated by the control means when the demand exceeds a higher value to start the motor for a second pump, a second control device responsive to the difference in pressure between the supply source and the tank, and means operated by the second control device to maintain the motor of said one pump in operation until said difference in pressure reaches a predetermined value.*

*10. A water pressure system comprising a plurality of pumps connected in parallel between a water supply source and a discharge conduit, a plurality of motors associated one with each of said pumps, pressure regulating means for said discharge conduit, a closed hydro-pneumatic tank adapted to contain both water and air, a connection from one of the pumps to the tank to pump water into the tank, a control device responsive to pressure in the tank to start the motor of said one pump when the pressure is below a predetermined value and to stop it when the pressure is above a higher predetermined value, a control means responsive to the demand on the system, means operated by the control means when the demand exceeds a predetermined low value to cause the motor of said one pump to operate continuously irrespective of the control device, and means operated by the control means when the demand exceeds a higher value to start the motor for a second pump, said means for starting the motor of the second pump including a time delay device.*

*11. A water pressure system comprising a plurality of pumps connected in parallel between a water supply source and a discharge conduit, a plurality of motors associated one with each of said pumps, pressure regulating means for said discharge conduit, a pressure regulator between each of the pumps and the discharge conduit, a closed hydro-pneumatic tank, a connection from the tank to a point between a first of the pumps and the pressure regulator therefor, a control device responsive to the pressure in the tank to start the motor of the first pump when the pressure is below a a predetermined value and to stop it when the pressure is above a higher predetermined value,*

*a flowmeter responsive to flow through the discharge conduit, a plurality of switches selectively closed by the flowmeter at different flow rates, the switch closed at minimum flow being connected to the control device to make it ineffective and the switches closed at higher flows directly controlling operation of all of the pump motors, a second control device responsive to the pressure differential between the tank and the water supply source, and means controlled by the second control device to maintain the motor of the first pump in operation until the pressure differential reaches a predetermined value.*

*12. A water pressure system for supplying water under pressure including the combination of a continuous-run type multiple pump system operable to supply substantial demands on the water pressure system and an intermittently operable hydro-pneumatic tank system for supplying lesser demands on the water pressure system comprising: a closed hydro-pneumatic tank for the hydro-pneumatic tank system adapted to contain both water and air; a first line connectable between a water supply source and a discharge conduit; a first steep-head-curve pump in said line and which is common to both the continuous-run multiple pump system and the hydro-pneumatic tank system whereby said pump in operation can supply water to either the tank or to the discharge conduit, a first motor for said first pump; a second line connectable between the water supply source and the discharge conduit and in parallel with said first line; a second pump of the multiple pump system in said second line, a second motor for said second pump; a pair of pressure regulating valves one in each of said lines downstreaam of the pump in the line to maintain constant system pressure in the discharge conduit and sized for regulation of the flow through their respective lines, said pressure regulating valve in the first line always operating when said first pump operates and permitting relatively wide pressure fluctuation in said tank and a pressure in said tank substantially higher than system pressure to take advantage of the pressure surge to tank prior to shut-off of the first pump; branch line means providing two-way water flow between said tank and said first line with the branch line means extending from said first line between said first pump and the pressure regulating valve in the first line whereby the first pump can supply water to the tank and with said branch line means defining the only water communication between the tank and the remainder of the water pressure system whereby flow from the tank to the discharge conduit is through*

*said branch line means and first line and flow is thereby controlled by the last-mentioned pressure regulating valve to subject tank-induced flow to pressure control; a control circuit for starting said first pump motor when tank pressure only slightly exceeds desired system pressure and for stopping said first pump motor after a sufficient period of operation to have the tank pressure substantially exceed desired system pressure to maintain a quantity of water under pressure in said first line which can flow to said tank through the branch line means and also to said discharge conduit if there is a continuing demand for water in the system, said control circuit comprising sensing means communicating with the tank and operatively connected to said first pump motor; said control circuit further including control means responsive to a predetermined demand on the system which is in excess of that normally supplied by the first pump; and means operated by the control means when the predetermined demand occurs in the system to start the second motor for the second pump, said pressure regulating valve in said second line preventing a pressure surge as the second pump comes into operation.*

References Cited

The following references, cited by the Examiner, are of record in the patented file of this patent or the original patent.

UNITED STATES PATENTS

| | | | |
|---|---|---|---|
| 3,030,891 | 4/1962 | Taylor | 103—25 |
| 3,050,079 | 4/1962 | Tognella | 103—12 |
| 3,195,555 | 7/1965 | Schaub | 103—11 |
| 3,363,572 | 1/1968 | Erck | 103—25 |
| 2,741,986 | 4/1956 | Smith | 103—11 |
| 2,888,875 | 6/1959 | Buck | 103—11 |
| 3,135,282 | 6/1964 | Gray | 103—11X |
| 3,141,475 | 7/1964 | Guinard et al. | 137—568 |
| 3,198,121 | 8/1965 | Schaub | 103—11 |
| 3,294,023 | 12/1966 | Vegue et al. | 103—11 |
| 3,295,450 | 1/1967 | Schonwald et al. | 103—25 |

FOREIGN PATENTS

| | | | |
|---|---|---|---|
| 301,145 | 5/1915 | Germany | 103—25 |
| 73,716 | 12/1915 | Switzerland | 417—3 |

WILLIAM L. FREEH, Primary Examiner

U.S. Cl. X.R.

417—7, 43, 12

PO-1050
(5/69)

UNITED STATES PATENT OFFICE
CERTIFICATE OF CORRECTION

Patent No. Re. 27,148 Dated June 29, 1971

Inventor(s) Robert F. Schaub

It is certified that error appears in the above-identified patent and that said Letters Patent are hereby corrected as shown below:

Cancel claims 5, 6, 7 and 8

Signed and sealed this 7th day of March 1972.

(SEAL)
Attest:

EDWARD M.FLETCHER,JR.
Attesting Officer

ROBERT GOTTSCHALK
Commissioner of Patents